United States Patent [19]

Baumberger et al.

[11] 4,082,263
[45] Apr. 4, 1978

[54] DOCUMENT FEEDING APPARATUS

[75] Inventors: John G. Baumberger, Johnson City; Michael A. Gazy, Apalachin; William C. Miller, Owega, all of N.Y.

[73] Assignee: International Business Machines Corporation, Armonk, N.Y.

[21] Appl. No.: 765,503

[22] Filed: Feb. 4, 1977

Related U.S. Application Data

[63] Continuation of Ser. No. 591,782, Jun. 30, 1975, abandoned.

[51] Int. Cl.² .......................... B65H 5/00; B65H 5/02
[52] U.S. Cl. ................................... 271/266; 226/134; 271/265; 271/275
[58] Field of Search ............... 271/246, 245, 229, 8 R, 271/DIG. 9, 265, 266, 275, 272, 264, 4; 226/37, 134; 355/14, 3 R

[56] References Cited

U.S. PATENT DOCUMENTS

| 3,804,514 | 4/1974 | Jasinski | 271/265 X |
| 3,831,829 | 8/1974 | Karpisek | 226/134 X |
| 3,844,552 | 10/1974 | Bleau et al. | 271/246 X |
| 3,888,478 | 6/1975 | Alderman et al. | 271/245 X |
| 3,910,570 | 10/1975 | Bleau | 271/245 |

Primary Examiner—Bruce H. Stoner, Jr.
Attorney, Agent, or Firm—Paul M. Brannen

[57] ABSTRACT

Document feeding apparatus for feeding original documents of varying length to the copying station of a copier machine. If the document is less than or equal to a predetermined length, the document is moved to the copying station, a corresponding copy is made, and the original document is then transported to an exit stacker. If the original document exceeds the predetermined length, which length is slightly less than the length of a copy document, then the feed moves the original document to and through the copy station in increments slightly shorter than the length of the copy document, until the entire length of the original document has been copied. A particular use of the invention is in connection with the copying of adding machine tapes.

3 Claims, 4 Drawing Figures

DOCUMENT FEEDING APPARATUS

This is a continuation of application Ser. No. 591,782 filed June 30, 1975, now abandoned.

FIELD OF THE INVENTION

This invention relates generally to document feed apparatus and in particular to document feed apparatus for feeding an original document in increments past a copying station.

DESCRIPTION OF THE PRIOR ART

Document feeders are already known in which a document is manually fed to a document feeding apparatus which senses the presence of a document, grasps the document and feeds it to a processing station, such as a copying station, with or without alignment of the document. After processing is complete, the document is then ejected from the processing station. These known arrangements did not provide for incrementally feeding documents greater than a predetermined length for processing.

SUMMARY OF THE INVENTION

Accordingly, an object of the present invention is to provide an improved original document feed for a copying machine.

Another object of the invention is to provide an improved original document feed for a copying machine in which original documents of varying length are fed to the machine in increments so that a sequential plurality of fixed length copies will contain thereon all of the material on the original document.

A particular object of the present invention is to provide an incremental original document feed for a copying machine.

A further object of the invention is to provide an incremental original document feed for a copying machine arranged to transport original documents to and from a copying station, and to feed the documents past the copying station in increments such that all of the material on the original document will be copied on seriatim copies.

Still another object of the invention is to provide an improved incremental document feed of the type described utilizing a conventional one-half revolution random start clutch and a one revolution clutch of similar construction.

Another object of the invention is to provide an incremental original document feed for a copying machine which will accept documents, manually loaded at an entry station, for feeding to a copying station when a preceding document has left the copying station.

In practicing the invention, a conventional copying machine is provided with a removable, or at least openable, cover which carries the document transport mechanism described hereinafter. The apparatus includes a manual entry station, where an operator can manually place or insert the leading edge of a document to be copied, such as a length of adding machine paper tape. First sensing means detects the insertion of the leading edge of the document, and operates a gripper device which seizes and holds the leading edge of the document.

When appropriate, the gate is opened and opposing feed rolls are closed on the leading portion of the document, the gripper lifted from the document allowing the rolls to feed forwardly into an alignment portion of the feed apparatus. This motion is governed by a first or random clutch means which, when energized, couples the entire transport mechanism to a prime mover, such as a transport drive motor. At this point, suitable aligner mechanisms align the moving document with a reference guide or surface.

As the leading edge of the document passes a second document sensor, a first timing means is started. This timer is adjusted to complete its timing cycle in such a time increment that one additional revolution of the main transport belt drive pulley will carry the leading edge of the tape to the far end of the copying area.

When the first timing means completes its cycle, second and third timing means are started, a second or increment clutch means is activated, and the random clutch means is deactivated.

The first and second clutch means are driven from the same prime mover, and their outputs are connected to the same shaft so it is possible that for some period of time both clutch means may be engaged to drive the transport.

The first or random clutch means has two engageable teeth for each revolution, so that it will stop driving the transport before the second or incrementing clutch means does so. Any time the second document sensor switch opens, prior to the completion of the timing cycle for the second timing means, a short document is indicated.

Accordingly, when the third timing means completes its cycle, the incrementing clutch means will be disengaged and the position of the tape is then determined by disengaging the increment clutch means after one revolution and having the mechanism coast to a stop. The transport velocity being relatively low and with the majority of the documents having a reasonably long blank space at the leading edge thereof, some variation in the stop point will be permissible since it is not excessive for the particular application for which the system is employed.

In the case where it is necessary to make a plurality of seriatim copies because the original document exceeds the length of the copy, the succeeding tape transport cycles are of the incrementing type and the motion of the additional portions of the tape are under control of the incrementing or second clutch means only. Also, in the incrementing mode in which the third timing means is employed, when this timing means completes its cycle during the incrementing mode, the transport drive motor is turned off so that disengaging of the increment clutch means occurs at a much lower velocity, which reduces the incrementing distance error. The drive motor is restarted during the time that the copying cycle is taking place and hence before this time to start the next incremental motion of the document. The documents are transported within the copying area by a relatively wide transport belt which frictionally engages the top of the document and carries it over a glass platen in the copying area. The diameter of the wide belt drive pulley is such that it drives the tape a distance which is slightly less than the copy area length, thereby ensuring that all portions of the tape will be copied during an incremental copying operation.

When the second document sensing means detects the fact that the trailing edge of the original document has passed before the second timer completes its cycle, one more incrementing cycle will take place and thereafter an eject operation will occur which will eject the entire remaining portion of the original document into a stacker or receiving bin.

Other objects of the invention and features of novelty and advantages thereof will become apparent from the detailed description to follow, taken in connection with the accompanying drawings.

GENERAL DESCRIPTION OF THE DRAWINGS

In the drawings.

Similar reference characters refer to similar parts in each of the several views.

DETAILED DESCRIPTION OF A PREFERRED EMBODIMENT

Figure 1:
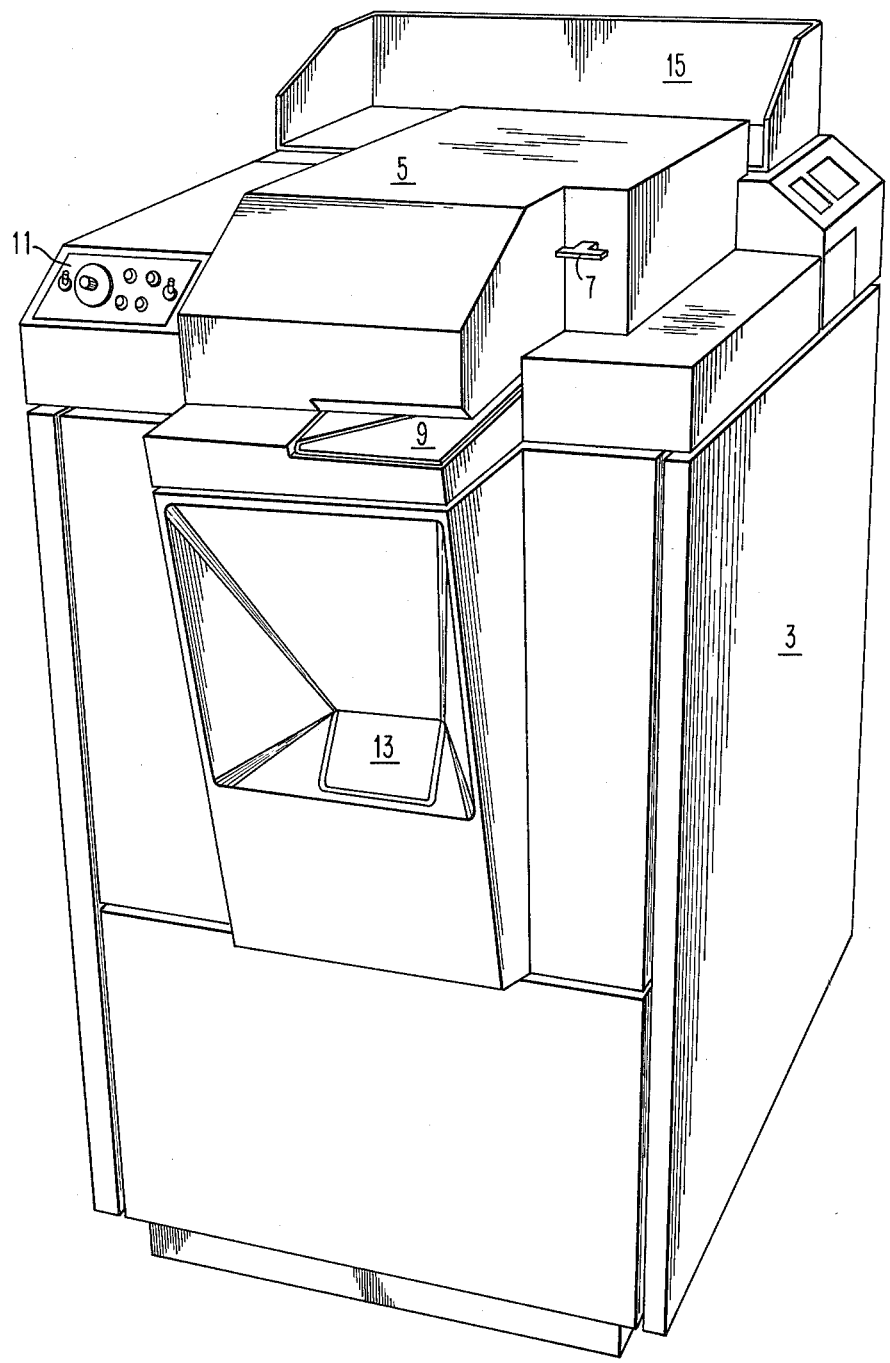
FIG. 1 is a diagrammatic illustration of a document copying machine embodying a preferred form of the invention.

Referring now to FIG. 1 of the drawings, there is shown in a schematic illustration the external appearance of a copying machine including an original document transport constituting the preferred embodiment of the present invention. The copying machine consists of a case 3, surmounted by a hinged top 5, which swings upwardly on hinges not shown when a release 7 is operated. At the front of the machine is a document entry station 9, into which documents such as adding machine tapes are placed face down and top foremost for copying. A plurality of operating controls are located on a panel 11 at the left-hand side of the machine as shown, and a discharge pocket for the copies is provided at 13. The original documents after having been copied are received in a stacker 15.

The copying machine per se is of the type known as the "Copier II" manufactured by International Business Machines Corporation. The operation of the copier in general is described in a Customer Engineering Service Manual Form No. 241-5705-0 and available from International Business Machines Corporation.

The detailed operation of the copying method and apparatus per se is not included herein, since it is included in the reference manual. Suffice it to say that documents to be copied are transported or otherwise placed on a glass platen on the copying area, with the documents face down. A copy cycle is then initiated in which the original document is exposed to suitable light and the image therefrom creates an electrographic image on a process drum which is transferred to suitable copy paper cut from a supply roll. The copy is then supplied to a copy receiver such as 13 in the machine shown in FIG. 1.

The present invention has to do with the provision of an improved document transport for transporting documents from a document entry station to the copying area, and then discharging them after the copy has been made, with the system being arranged so that if the original document is longer than a predetermined length, incremental feeding of the original document will occur with suitable copies being made of the incremented original document, so that all information on an original document, despite its length, will be copied onto seriatim copies.

Figure 2:
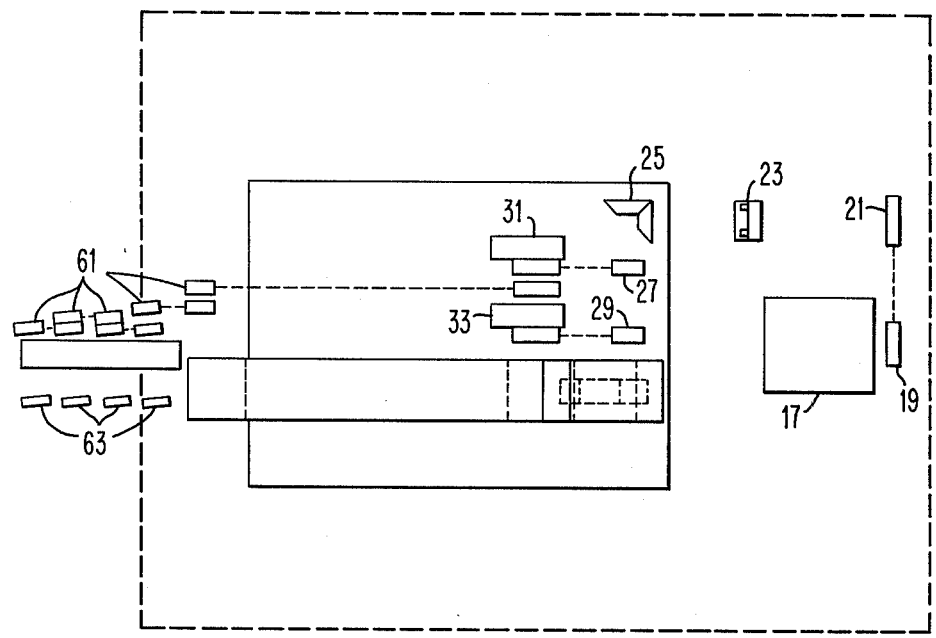
FIG. 2 is a schematic plan view of certain portions of the mechanical features in the machine in accordance with a preferred form of the invention.
Figure 3:
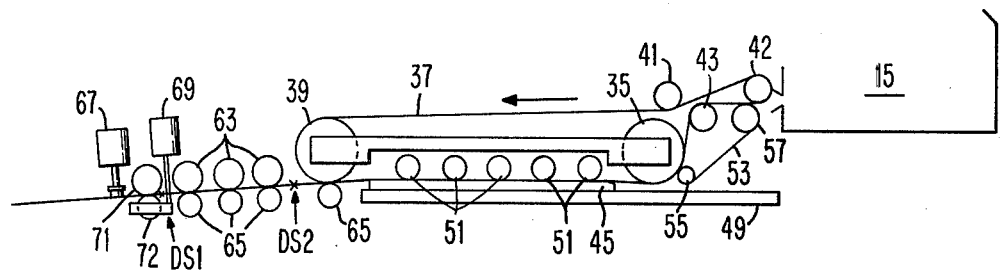
FIG. 3 is an elevation view schematically showing the document path through the machine.

FIGS. 2 and 3 illustrate in a highly schematic form the pertinent mechanical portions of the document transport constituting a preferred embodiment of the present invention.

Drive motor 17 furnishes the operating power for the transport via a mechanical drive train including pulleys 19 and 21, pin coupling 23, bevel gears 25, pulleys 27 and 29 and the clutches 31 and 33. Clutch 31 is designated as the increment clutch and clutch 33 is designated as the random clutch. The outputs of clutches 31 and 33 are connected to the same shaft which drives the transport drive pulley 35.

A main transport belt 37 is driven by pulley 35 in the direction indicated by the arrow. Belt 37 is entrained over a large idler pulley 39, and a number of smaller pulleys 41, 42 and 43.

The lower surface of belt 37 passes over a mask 45, which is located on top of the usual glass copying platen 49 provided in copying machines of this general type. A number of bogey wheels or idlers 51 keep the lower surface of belt 37 in contact with the upper surface of the mask plate 45.

An eject belt trained over pulleys 55 and 57 is in frictional engagement with the wide transport belt 37, so that it is driven thereby.

At the left-hand end, which is the feed or input end of the machine, a plurality of pulleys 61 are provided, driven from the main shaft which drives pulley 35 from clutches 31 and 33. The pulleys 61 drive a plurality of aligner wheels 63, which are constructed and arranged in the manner shown and described in U.S. Pat. No. 3,148,877, so that a document passing through the aligner will be moved over until it is in engagement with an alignment guide or edge, thereby aligning the document for further movement into and through the transport. A plurality of idler rolls 65 underly the rolls 63 and the pulley 39 as can be seen in FIG. 3.

In FIG. 3, there is also shown at the left end of the drawing a gripper release solenoid 67, which is arranged to a release a spring biased grip which grips the leading edge of document inserted in the entrance chute 9 and hold the document for further transport into the machine. Solenoid 69 is arranged to operate a pair of separable feed rolls 71 and 72, which are arranged so that they are normally open and are closed by energization of the solenoid. The assembly also includes a document gate or stop which is moved out of the way of the document when the solenoid 69 is energized. Thus, when a document is entered into the entry chute 9, it will pass beneath the gripper and can be pushed until its leading edge encounters the gate operated by the solenoid 69. At this point, designated DS1 a document sensing switch DSW1, shown in FIG. 4, is located and is arranged so that when the leading edge of the document is at the gate, the document sensing switch will be operated through energized electrical circuits to be subsequently described.

If there is no preceding document in the transport, sensing of the document at the entry chute by DSW1 will energize solenoid 69 and also start the transport driving mechanism so that the leading edge of the document is gripped between the rolls 71 and 72 and started through the transport. Its edge will be brought into alignment by the aligner rolls 63, and the front end will then move into engagement with the lower surface of belt 37, which frictionally engages the top surface of the document and pulls it toward the right until it reaches the proper position on the mask 45, at which time a copying cycle will take place. Thereafter, when the copying cycle finishes, the transport mechanism will again be energized and the leading edge of the document will be moved out over the eject belt 53 and fed into the receiver or stacker pocket 15.

If, at the time the leading edge of the document is inserted in the entry chute, a preceding document is still in the transport between the gate and copy position, then the solenoid 69 will not be energized, but solenoid 67 will be de-energized by the document operating the sensing switch DSW1 at the gate and the gripper thereby will come down upon the leading edge of the tape and hold it in place, even though the operator releases his hold on the document. With the document thus held by the gripper, when the preceding document is clear, then solenoid 69 is energized to cause the separable feed rolls to grip the succeeding document and urge it through the document feed. When solenoid 69 has lifted the gate to its extreme upward position, a switch operated from the gate causes solenoid 67 to be energized thus releasing the document to move under control of rolls 71 and 72 and other transport elements it subsequently encounters.

Figure 4:
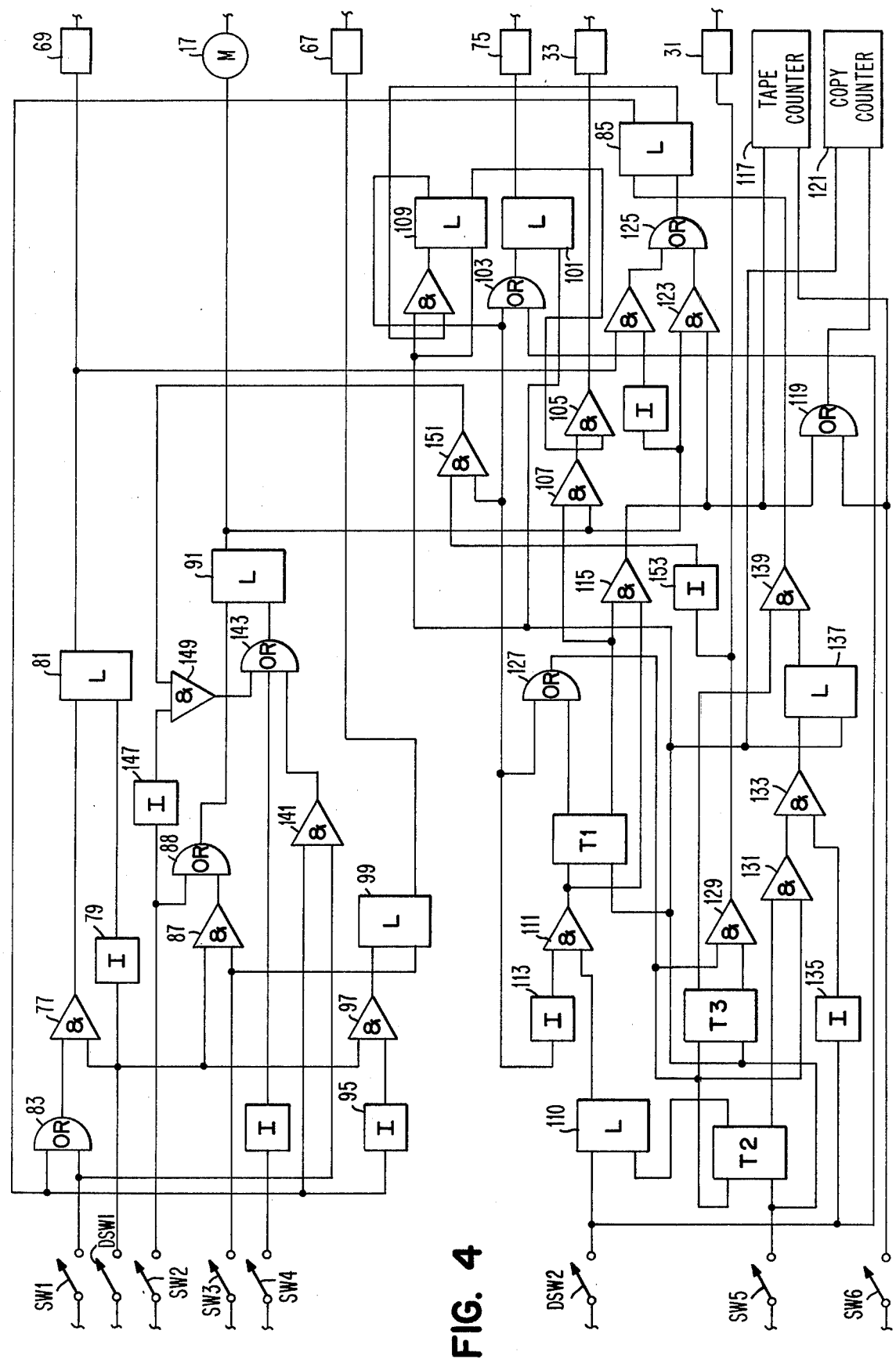
FIG. 4 is a schematic logic diagram illustrating one preferred form of the control circuitry.

FIG. 4 illustrates in a schematic form, using conventional logic symbols, a control arrangement which may be utilized with the mechanical configuration shown in FIGS. 1, 2 and 3 to constitute a preferred embodiment of the invention. It will be obvious to those skilled in the art that either relay circuitry of suitable nature or electronic circuitry employing vacuum tubes or solid state devices could be used in accordance with the logic diagram of FIG. 4. The logic symbols are those for conventional AND and OR, combinatorial logic, latching or two-state stable devices, and timing elements. The inputs to the logic circuitry consist of open or closed switches located in various parts of the machine for supplying signals indicating the state of various portions of the machine, the presence or absence of documents and the particular portion of the copying cycle as it occurs. The outputs of the logic circuitry include the gate solenoid 69, the document transport drive motor 17, the tape grip release solenoid 67, a start copier relay 75, the random clutch 33 and the increment clutch 31. Also shown are two counters which may be either of the electromechanical or the electronic variety, designated as a tape counter and a copy counter, and arranged so that the count which they accumulate is projected through the mask, so that the number of the tape and the number of the copy are provided on the copies made by the machine.

The apparatus is shown in its initial or reset state, and it is assumed that power is applied to the machine as a whole and that all resettable devices have been set to their initial condition. Under such circumstances, when a tape is first supplied to the entry chute 9 as shown in FIG. 1, the end of the tape can be moved to the location of the first document sensing switch DSW1 and the leading edge of the tape will cause switch DSW1 to be operated. This supplies a signal to the AND circuit 77 and inverter 79, the output of inverter 79 being connected to the reset side of a latch 81. With the input to inverter 79 active, the output is inactive and latch 81 can be set on by the output of AND circuit 77, which has its other input connected to an OR circuit 83, to a switch SW1 which indicates that the copier itself is not yet running. In addition to the input to OR circuit 83 from switch SW1, this circuit may also be energized by the output of a latch 85 which is set on when it is proper to initiate a document feed. In either case, the setting on of latch 81 will supply a signal to the gate solenoid 69, to thereby open the gate and also cause the pinch rolls to engage to thereby grasp the leading edge of the document.

When the gate opens, a switch SW3 is closed and at that time, both inputs to an AND circuit 87 are active, and the output therefrom is supplied to an OR circuit 88 to a latch 91, to thereby set the latch on. This latch controls the operation of the transport drive motor 17 and accordingly this motor is energized to start the transport and pull the tape into the copier. At this time, with the output of latch 85 considered to be in its OFF state, the output of an inverter 95 is activated, thereby activating one input to AND circuit 97, the other input of which is activated at this time since switch DS1 is closed. Also, latch 99 has an overriding reset, so it is turned off at any time that gate switch SW3 is closed, to thereby energize the gripper solenoid 67. Under these circumstances, the tape gripper release solenoid 67 will be energized and the tape will be free to move.

A relay 75 is utilized to control the circuitry for causing the copier apparatus per se to execute an operating cycle when it is energized by the output from a latch 101. When the incoming document's leading edge reaches the document sensor switch DSW2, at location DS2, it closes a circuit through one input of OR circuit 103 to set latch 101 on, thereby energizing relay 75 and starting the execution of a copier cycle.

Prior to this time, the random clutch 33 is energized from the output of an AND circuit 105, which has one of its inputs connected to an AND circuit 107. One of the inputs of AND circuit 107 is from the output of latch 91, which it will be remembered starts the transport motor. At this time, with timer T1 in its initial or reset condition, an output signal will be provided to the other input of AND circuit 107, while the other input to AND circuit 105 is supplied from the reset or lower output of a latch 109 which may be described as controlling incremental operation only.

Under the circumstances described, the random clutch will be energized, and with the transport motor operating, the transport will be effective to carry the document to the document sensor location DS2.

DSW2 being activated, supplies a signal to set on a latch 110, the output of which is supplied to one input of an AND circuit 111, the other input being connected through an inverter 113 to the output of latch 109. The output of AND circuit 111 is supplied to the timer T1, which then starts its timing cycle.

At the time that the output of AND circuit 111 becomes active, the timer T1 will be in its reset condition, and accordingly both inputs will be active at an AND circuit 115. The output of this AND circuit is supplied as an input to the tape counter 117 causing it to advance to indicate the first tape being processed. Also via an OR circuit 119, the output is supplied to reset the copy counter 121 in the event that it was not already reset via the switch SW6. The output of AND circuit 115 is further supplied as one input to an AND circuit 123, the other input of which is connected to the output of latch 91.

After a predetermined time interval, timer T1 will complete its timing cycle and provide an output to one input of an OR circuit 127. The output of OR circuit 127 is supplied to one input of an AND circuit 129, and to the turn-on inputs of timers T2 and T3, which thereupon start their timing out. Before T3 times out, its initial or reset output constitutes another input to AND circuit 129, the output of which is supplied to the increment clutch 31. The increment clutch will accordingly be started at this time. De-energization of the one input to AND circuit 107 will cause deactivation of the random clutch 33 and this clutch pawl will drop to stop the clutch at the next clutching point.

The output of OR circuit 127 is also supplied to one input of an AND circuit 131, the other input of which is from the normal or reset output of the timer T2. The output of AND circuit 131 forms one input of AND circuit 133, and the other input of AND circuit 133 is connected via an inverter 135 to the output of switch DSW2. When both inputs to AND circuit 133 are active, the output will set on latch 137 to indicate that another copy cycle will not be required. The output of latch 137 forms one input to an AND circuit 139, the output of which is connected to the control of the READY latch 85, to indicate that another document could be fed.

The measurement of the original document is carried out by operation of timer T2 in the above-described circuitry to indicate whether or not the feed should be incremented to copy an overlong original document.

When T2 completes its timing cycle, its output supplies a resetting signal to latch 110. Also, of course, the normal signal supplied to AND circuit 131 is cut off at this time. However, if latch 137 has been previously set, it will remain set at this time.

After a further time interval, the timer T3 will complete its operating cycle, and when the normal output of T3 supplied to AND circuit 129 is removed, the pawl of the increment clutch 31 will be dropped. The output of timer T3 will now be supplied to the other input of AND circuit 139, so that the control is now effective to set latch 85 on, which indicates that the next original document can be fed.

When the end of the copying cycle is reached, switch SW5 is closed and provides a resetting signal to the timers T1, T2 and T3, a reset to latch 137, an input to copy counter 121 to thereby increment the number standing in the counter by 1, and a resetting signal to the latch 101.

With timer T1 reset, an input is provided to AND circuit 107, and since the drive motor 17 is running because the output of latch 91 is up, an output will be supplied through AND circuit 105 to thereby pick the random clutch 33, causing the transport mechanism to become engaged and to eject the document into the original document receiver 15 by way of the eject belt 53 and its associated drives as shown in FIG. 3 of the drawings.

At some time after completion of the copy cycle, the switch SW1 is closed to indicate that the copier is no longer running. This supplies a signal to one input of an AND circuit 141, the other input of which is the output line from the latch 85. The output of AND circuit 141 is passed by an OR circuit 143 to the reset side of latch 91, so that latch 91 is turned off. This will de-energize the motor circuit for transport motor 17 which accordingly will come to a stop.

The foregoing concludes an operating cycle for a single document which is less than a predetermined length so that all the information can be copied thereon by making a single copy.

Switch SW2 is a switch which is closed during the middle of the cycle of the copying machine, and having one input to OR circuit 88 will cause latch 91 to be maintained on should any other of the circuity be effective to turn the latch off while the copying operation is occurring. This input is also supplied through an inverter 147 to one input of AND circuit 149, the output of which is supplied to the resetting OR circuit 143 for latch 91. Accordingly, during mid-copy cycle, any inputs to the AND circuit 149 are ineffective to reset latch 91. At other times, the second input to AND circuit 149 is supplied from an AND circuit 151, one input of which constitutes the output of latch 109, the other input of which constitutes the output of AND circuit 129 via an inverter 153. Under these conditions, therefore, with the latch 109 set and the increment clutch 31 de-energized, a resetting circuit for latch 91 will be effective via AND circuit 149. The motor 17 is accordingly de-energized at this time.

If, at this time, the switch DSW2 remains closed, indicating that another cycle or more than one cycle is required because the length of the original document is longer than that for a single copy, the output of latch 109 is supplied via OR circuit 127 to the set inputs of timers T2 and T3. Even though latch 110 is set on, its output is now ineffective because the signal from latch 109 via inverter 113 disables AND circuit 111, hence timer T1 is not started. The circuit including OR circuit 103 and latch 101 will cause the relay 75 to be energized to start another copying cycle. Copying cycles will be repeated until switch DSW2 and timer T2 and associated circuitry indicate that the trailing edge of the original document is no longer in the critical control area.

Should the operator insert a following original document into the feed chute prior to the time that a preceding document has been fully copied, document gate solenoid 69 will be de-energized, and therefore the gate will be closed and the document cannot be entered fully into the feed end of the machine. Also the tape grip release solenoid 67 will be de-energized by the presence of the leading edge of the document at switch DS1, and the gripper will hold the leading edge of the document until such time as latch 85 indicates that the machine can accept the document to initiate another copying operation.

While the invention has been particularly shown and described with reference to a preferred embodiment thereof, it will be understood by those skilled in the art that various changes in form and details may be made therein without departing from the spirit and scope of the invention.

We claim:

1. Document handling means comprising in combination,
   a document receiving station for receiving manually inserted original documents of varying lengths,
   a document copying station,
   document transport means for transporting said documents to and through said copying station,
   document feed means at said receiving station for feeding a document from said receiving station to said transport means,
   document measuring means for providing an output when said documents are greater than a predetermined length, said document measuring means comprising first and second document sensors spaced along the path of document travel from said receiving station to said copying station,
   and document transport control means governed by circuit means including said first and second document sensors, said document transport means including an incrementing clutch means for operating said transport means to provide increments of motion equal to said predetermined length when said document measuring means provides said output.

2. Document handling means as claimed in claim 1 in which said document measuring means further comprises timing means connected to said document sensors for determining whether the time required for original documents to traverse a fixed distance exceeds a predetermined amount and thereby provides said output.

3. Document handling means as claimed in claim 2 in which said timing means comprises a plurality of timer means having different operating times.

* * * * *